(12) United States Patent
Yamamoto et al.

(10) Patent No.: US 12,174,317 B2
(45) Date of Patent: Dec. 24, 2024

(54) DISTANCE MEASURING DEVICE

(71) Applicant: DENSO CORPORATION, Kariya (JP)

(72) Inventors: Masahiro Yamamoto, Kariya (JP); Jiro Momen, Kariya (JP)

(73) Assignee: DENSO CORPORATION, Kariya (JP)

( * ) Notice: Subject to any disclaimer, the term of this patent is extended or adjusted under 35 U.S.C. 154(b) by 1014 days.

(21) Appl. No.: 17/138,681

(22) Filed: Dec. 30, 2020

(65) Prior Publication Data

US 2021/0116544 A1 Apr. 22, 2021

Related U.S. Application Data

(63) Continuation of application No. PCT/JP2019/026119, filed on Jul. 1, 2019.

(30) Foreign Application Priority Data

Jul. 2, 2018 (JP) ................................. 2018-126093

(51) Int. Cl.
| | | |
|---|---|---|
| G01S 7/481 | (2006.01) | |
| B60S 1/02 | (2006.01) | |
| G01S 17/08 | (2006.01) | |
| G01S 17/931 | (2020.01) | |

(52) U.S. Cl.
CPC ............. *G01S 7/4811* (2013.01); *B60S 1/023* (2013.01); *G01S 17/08* (2013.01); *G01S 17/931* (2020.01)

(58) Field of Classification Search
CPC ...... G01S 7/4811; G01S 17/08; G01S 17/931; G01S 7/4813; G01S 7/4039; G01S 7/4043; G01S 7/4047; G01S 2007/4977; G01S 7/497; G01S 13/931; B60S 1/023; B60S 1/56
USPC ......................................................... 356/4.01
See application file for complete search history.

(56) References Cited

U.S. PATENT DOCUMENTS

| | | | |
|---|---|---|---|
| 6,414,623 B1 | 7/2002 | Ashihara | |
| 2003/0155001 A1* | 8/2003 | Hoetzer | ................ B60S 1/0822 134/52 |
| 2011/0073142 A1* | 3/2011 | Hattori | .................. B60S 1/0848 134/198 |
| 2012/0103960 A1 | 5/2012 | Bressand et al. | |
| 2014/0320845 A1 | 10/2014 | Bayha et al. | |

FOREIGN PATENT DOCUMENTS

| | | |
|---|---|---|
| JP | H05-157830 A | 6/1993 |
| JP | H08-29535 A | 2/1996 |
| JP | H11-23714 A | 1/1999 |

(Continued)

*Primary Examiner* — Daniel L Murphy
(74) *Attorney, Agent, or Firm* — MASCHOFF BRENNAN

(57) ABSTRACT

A distance measuring device includes a measuring unit, a controlling unit, and an accessory part. The measuring unit includes an applying unit that applies a transmission wave and a detector that detects a reflected wave resulting from the transmission wave. The controlling unit is configured to perform a measurement, by using the measuring unit, a distance to an object to which the transmission wave is applied. The accessory part is attached to the measuring unit and configured to operate when energized. The controlling unit is configured to control energization of the accessory part in accordance with a state of the measurement of the distance performed by using the measuring unit.

9 Claims, 8 Drawing Sheets

(56) References Cited

FOREIGN PATENT DOCUMENTS

| | | |
|---|---|---|
| JP | H11-183611 A | 7/1999 |
| JP | 2003-57339 A | 2/2003 |
| JP | 2009-192430 A | 8/2009 |

* cited by examiner

DISTANCE MEASURING DEVICE

CROSS-REFERENCE TO RELATED APPLICATION

The present application is a continuation application of International Application No. PCT/JP2019/026119, filed on Jul. 1, 2019, which claims priority to Japanese Patent Application No. 2018-126093, filed on Jul. 2, 2018. The contents of these applications are incorporated herein by reference in their entirety.

BACKGROUND

Technical Field

The present disclosure relates to a distance measuring device that measures a distance to an object.

Background Art

An example of a distance measuring device installed in a vehicle to measure a distance to an object in front of the vehicle is a distance measuring device that applies a transmission wave forward and detects a reflected wave from an object to which the transmission wave is applied to detect a distance to the object.

SUMMARY

In the present disclosure, provided is a distance measuring device as the following. The distance measuring device includes a measuring unit, a controlling unit, and an accessory part. The measuring unit includes an applying unit that applies a transmission wave and a detector that detects a reflected wave resulting from the transmission wave. The controlling unit is configured to perform a measurement, by using the measuring unit, a distance to an object to which the transmission wave is applied. The accessory part is attached to the measuring unit and configured to operate when energized. The controlling unit is configured to control energization of the accessory part in accordance with a state of the measurement of the distance performed by using the measuring unit.

DETAILED DESCRIPTION OF THE PREFERRED EMBODIMENTS

In the distance measuring device, a cover is provided in front of an applying unit that applies a transmission wave and a detector that detects a reflected wave to protect them. However, if snow, frost, raindrops, dust, etc. stick to the cover, the measurement accuracy of the distance measuring device decreases in some cases.

Accordingly, PTL 1 describes that a heater is provided in a cover of a distance measuring device to melt snow or frost. PTL 1 also described that an ultrasonic vibrator is provided in the cover of the distance measuring device to repel raindrops and dust.

[PTL 1] JP 8-29535 A

However, a study by the present inventor has found that a new problem, that is, a decrease in the measurement accuracy, occurs in a case where a distance measuring device includes an accessory part such as a heater or an ultrasonic vibrator. This is believed to be because electrical noise affects a result of measurement by the distance measuring device when the accessory part starts to be energized and when the accessory part is deenergized.

An aspect of the present disclosure reduces a decrease in the measurement accuracy of a distance measuring device resulting from starting and stopping the energization of the accessory part.

An aspect of the present disclosure is a distance measuring device, which includes a measuring unit, a controlling unit, and an accessory part. The measuring unit includes an applying unit that applies a transmission wave and a detector that detects a reflected wave resulting from the transmission wave. The controlling unit is configured to perform a measurement, by using the measuring unit, a distance to an object to which the transmission wave is applied. The accessory part is attached to the measuring unit and configured to operate when energized. The controlling unit is configured to control energization of the accessory part in accordance with a state of the measurement of the distance performed by using the measuring unit.

By virtue of such a configuration, the energization of the accessory part is controlled in accordance with the state of the measurement of the distance performed by using the measuring unit, whereby it is possible to reduce a decrease in the measurement accuracy of the distance measuring device resulting from the energization of the accessory part.

Description will be made below on exemplary embodiments of the present disclosure with reference to the drawings.

1. First Embodiment

1-1. Configuration

Figure 1:
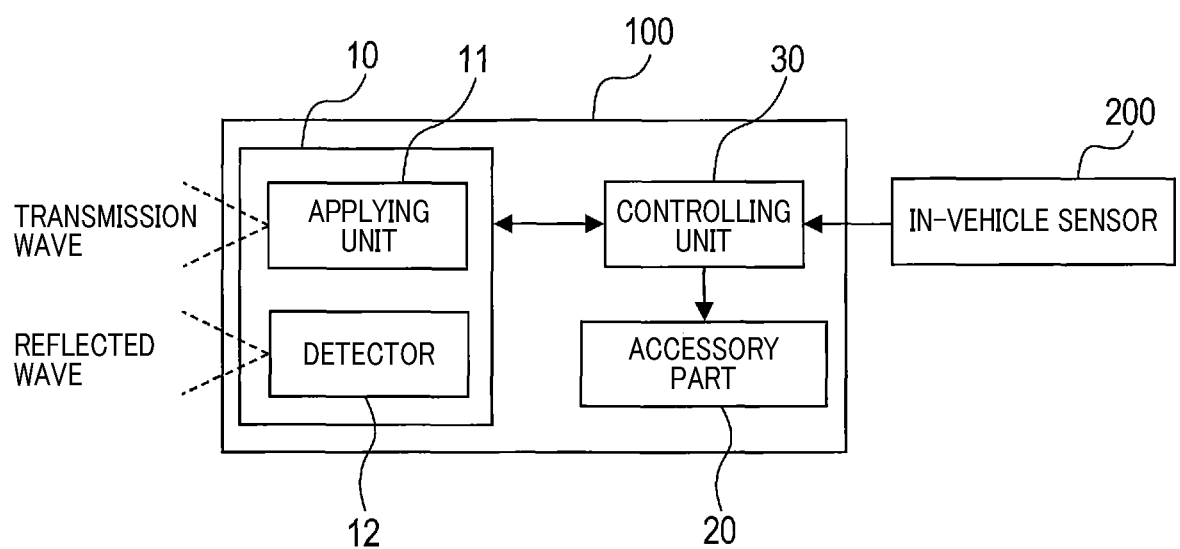
FIG. 1 is a block diagram showing a configuration of a lidar device.

A lidar device 100 shown in FIG. 1 is a distance measuring device that measures a distance to an object by applying light as a transmission wave and detecting a reflected wave resulting from the applied light. The lidar is also expressed as LIDAR. LIDAR is an abbreviation for Light Detection and Ranging. The lidar device 100 is to be installed in a vehicle in use and used to detect various objects present in front of the vehicle.

The lidar device 100 includes a measuring unit 10, an accessory part 20, and a controlling unit 30.

The measuring unit 10 includes an applying unit 11 that intermittently applies light and a detector 12 that detects a reflected wave resulting from the light. The applying unit 11 applies a laser beam as the light. The detector 12 receives and converts the reflected wave from the object into an electric signal.

Figure 2:
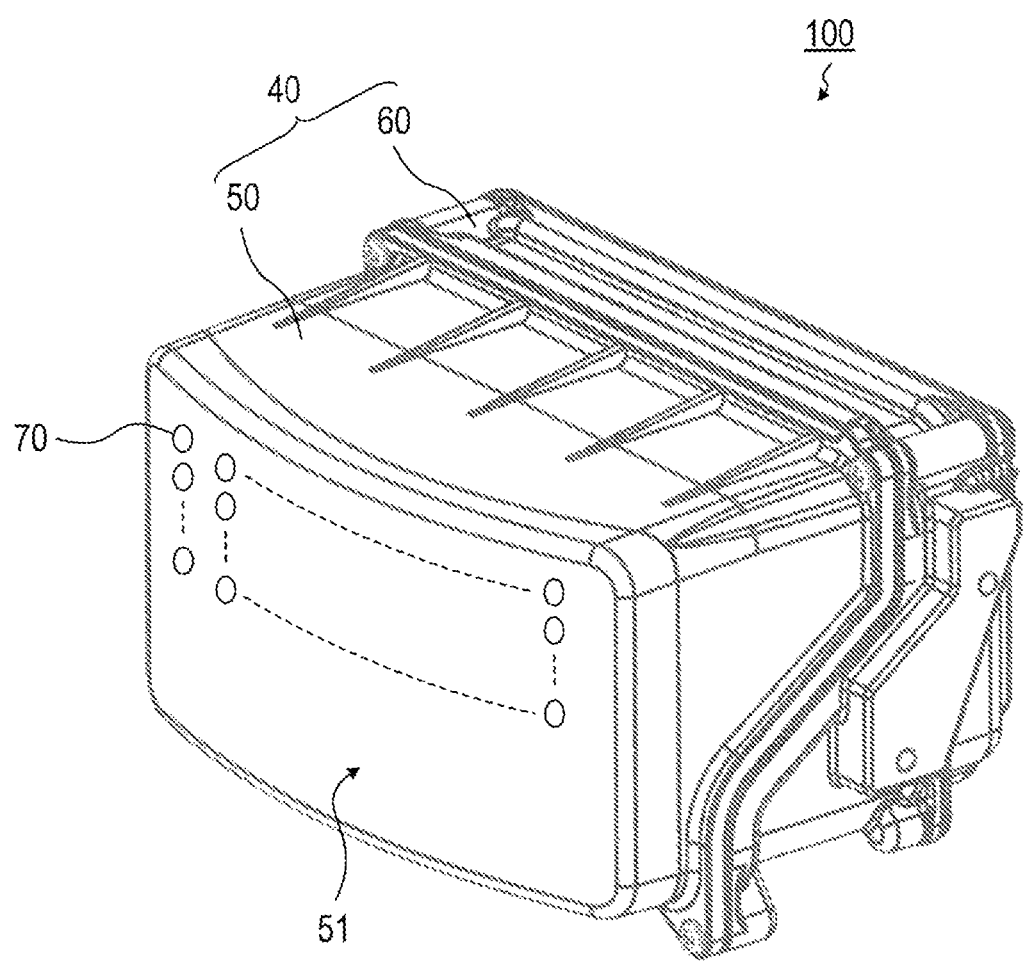
FIG. 2 shows an appearance of the lidar device.

The measuring unit 10 is housed within a casing 40 including a cover 50 and a casing body 60 shown in FIG. 2. The applying unit 11 of the measuring unit 10 is housed in an upper region of a space within the casing 40. Meanwhile, the detector 12 is housed in a lower region of the space within the casing 40.

A transparent transmissive window 51 that lets light through is provided at a front surface of the cover 50. The front surface herein refers to a surface of the lidar device 100 on the side irradiated with light.

Figure 3:
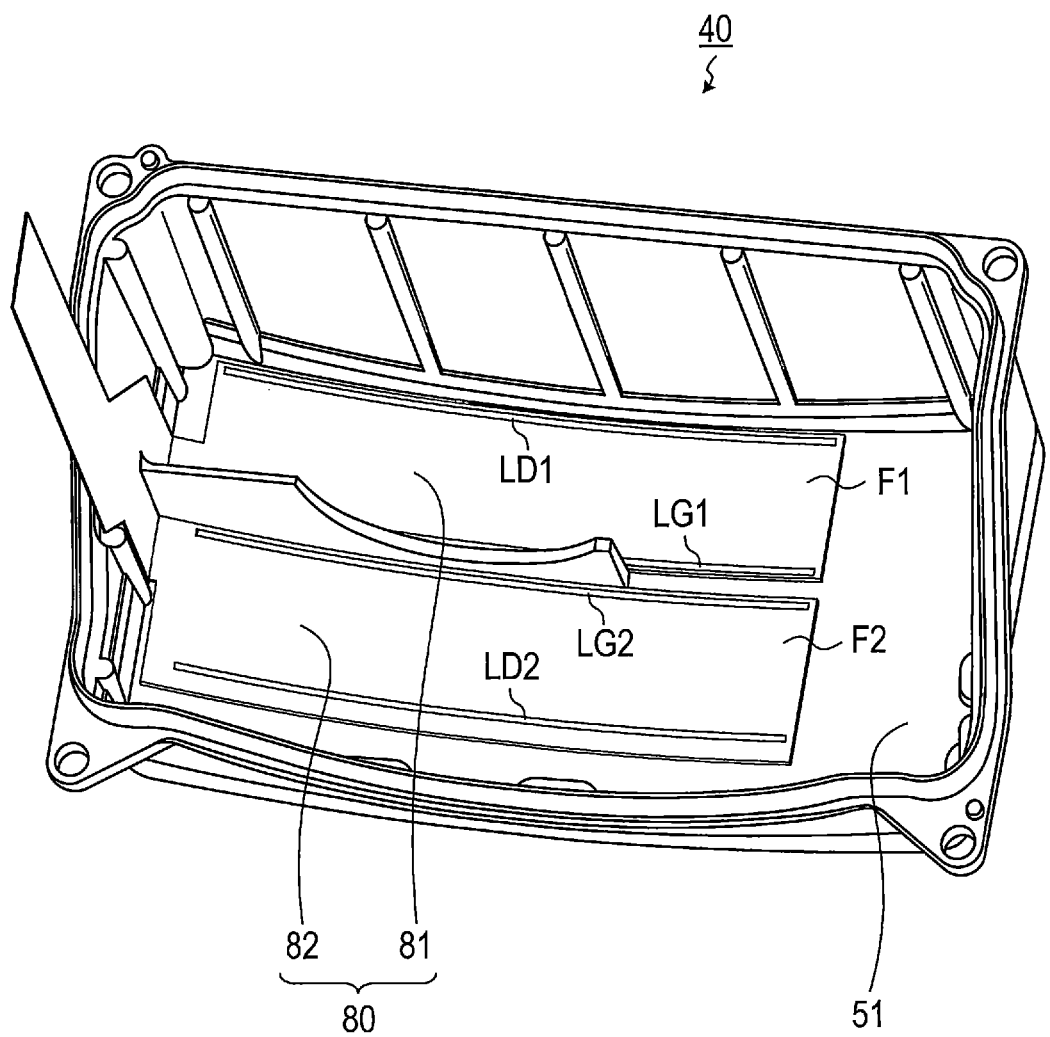
FIG. 3 shows a cover of the lidar device as viewed from inside.

The accessory part 20, which is a part attached to the measuring unit 10, is caused to operate when energized. In the present embodiment, the accessory part 20 is a heater 80. The heater 80 is provided on an inner surface of the transmissive window 51 as shown in FIG. 3 and used to heat the transmissive window 51. The heater 80 includes an irradiation-side heater 81 provided on an applying unit 11 side in the transmissive window 51 and a detection-side heater 82 provided on a detector 12 side in the transmissive window 51. The irradiation-side heater 81 and the detection-side heater 82 each include a transparent conductive film Fi and a pair of electrodes LDi and LGi. It should be noted that i denotes 1 when they belong to the irradiation-side heater 81 while denoting 2 when they belong to the detection-side heater 82. The transparent conductive film Fi is a heater film formed of a transparent and electrically conductive material. For example, an ITO film may be used as the transparent conductive film Fi. ITO is an inorganic compound of indium oxide and tin oxide.

The controlling unit 30 measures, by using the measuring unit 10, a distance to an object to which the light is applied. Specifically, the controlling unit 30 determines a timing when the reflected wave is detected on the basis of the waveform of the electric signal inputted to the controlling unit 30 by the detector 12 and obtains the distance to the object on the basis of a difference between the timing and a timing when the light is applied. It should be noted that the controlling unit 30 can obtain information regarding the object, such as the orientation of the object, in addition to the distance.

With the application of light toward a specific measurement spot and the detection of a reflected wave considered as one measurement, the controlling unit 30 performs such measurements for the respective measurement spots present within a measurement range. Further, with the measurements for the respective measurement spots present within the measurement range considered as a series of measurements, the controlling unit 30 repeats a series of such measurements for the respective measurement spots every predetermined period. A region 70 shown in FIG. 2 schematically shows, within the surface of the transmissive window 51, a region where light applied toward a specific measurement spot is to pass.

The controlling unit 30 also controls the ON/OFF switching of the energization of the accessory part 20 in addition to measuring the distance. That is, the measuring unit 10 and the accessory part 20 are connected to a common circuit board. The above-described problem, a decrease in the measurement accuracy of the measuring unit 10, occurs because noise sometimes interferes with the waveform of the electrical signal inputted by the detector 12 resulting from the ON/OFF switching of the energization of the accessory part 20.

The ON/OFF switching of the energization of the accessory part 20 is controlled on the basis of information acquired from an in-vehicle sensor 200, such as an outdoor temperature sensor, an indoor temperature sensor, and a vehicle speed sensor, installed in the vehicle. Adhesion of snow or frost can be reduced by moderately heating the heat transmissive window 51 with the accessory part 20. It should be noted that the ON/OFF switching of the energization of the accessory part 20 may be performed by PWM control.

In this regard, the controlling unit 30 controls the ON/OFF switching of the energization of the accessory part 20 in accordance with the state of the measurement of the distance by using the measuring unit 10. A control process for the ON/OFF switching of energization to be performed by the controlling unit 30 will be described later in detail.

1-2. Process

Description will be given of an outline of the control process for the ON/OFF switching of the energization of the accessory part 20 to be performed by the controlling unit 30 with reference to FIG. 4.

Figure 4:
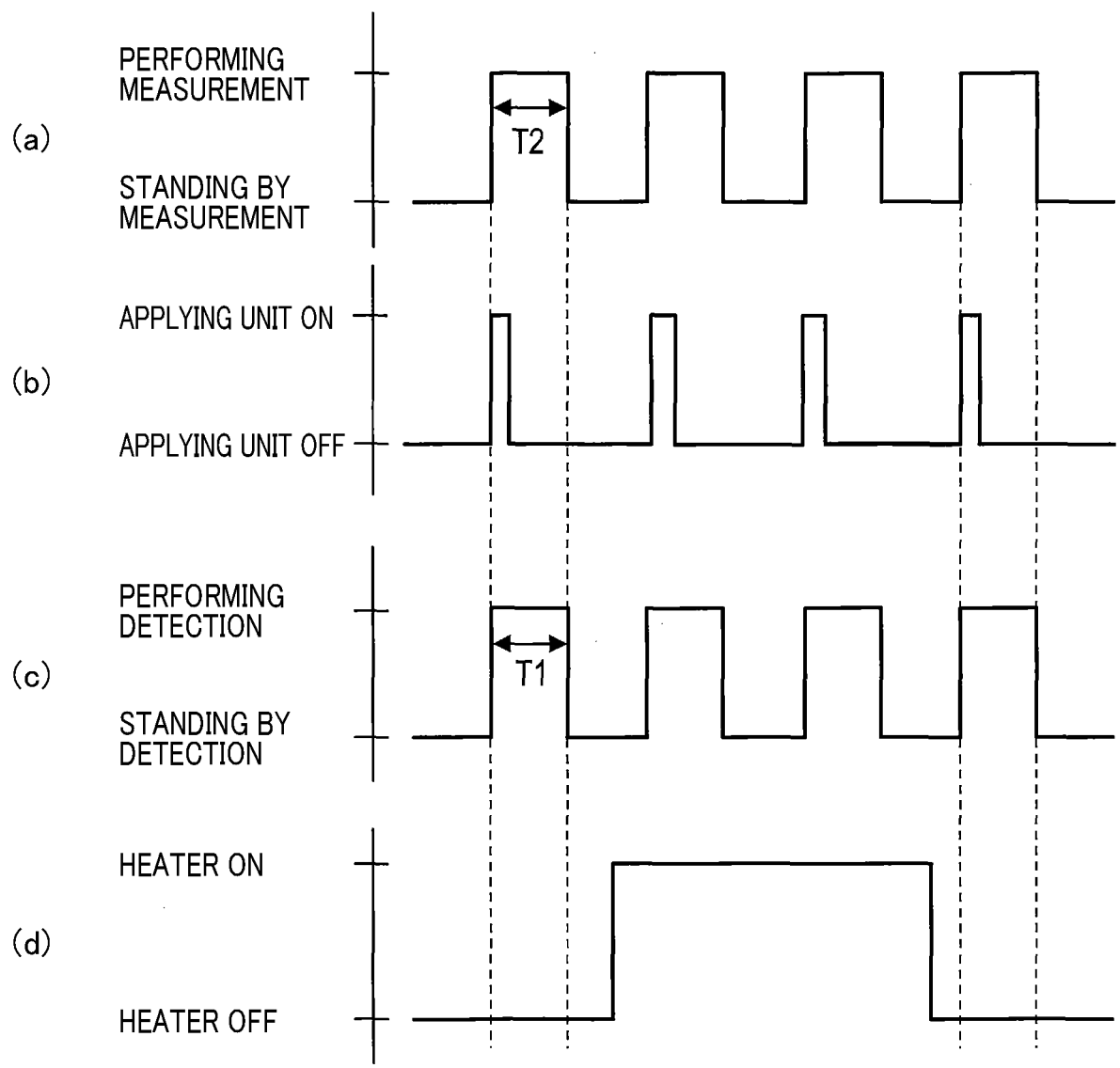
FIG. 4 is a diagram of assistance in explaining a relationship between the state of measurement of a distance by a measuring unit and the state of energization of a heater in a first embodiment.

The measuring unit 10 temporarily transitions to a measurement standby state when completing measurement for one measurement spot as shown in a graph (a) in FIG. 4. This is commonly performed in a lidar device to allow a light source of a laser beam or the like to cool down to maintain the lifetime of the light source.

The controlling unit 30 determines whether the controlling unit 30 is performing one measurement for one measurement spot by using the measuring unit 10 or the controlling unit 30 is in the standby state. In a case where the controlling unit 30 is performing one measurement for one measurement spot, the ON/OFF switching of the accessory part 20 is not to be performed as shown in a graph (d) in FIG. 4. That is, in a case where the controlling unit 30 is performing one measurement for one measurement spot, the controlling unit 30 neither starts nor stops the energization of the accessory part 20. This is because there is a possibility that noise interferes with the waveform of the electrical signal inputted to the controlling unit 30 by the detector 12 when the ON/OFF of the energization of the accessory part 20 is switched.

In the present embodiment, the controlling unit 30 determines whether the controlling unit 30 is performing one measurement for one measurement spot by using the measuring unit 10 or the controlling unit 30 is in the standby state depending on whether the present time is within a detection period T1 for which the detector 12 detects the reflected wave. That is, the controlling unit 30 neither starts nor stops the energization of the accessory part 20 during the detection period T1 of the detector 12.

The detection period T1 refers to a period for which the controlling unit 30 detects the reflected wave by using the detector 12. Specifically, as shown in graphs (b) and (c) in FIG. 4, the detection period T1 starts at the same time as or slightly later than when the applying unit 11 starts applying light and continues until the elapse of a predetermined period set in advance. The predetermined period refers to a period determined assuming reflection from an object to be detected at the farthest distance. That is, the waveform of an electrical signal during the detection period T1 is recognized as a reflected wave from the object.

Figure 5:
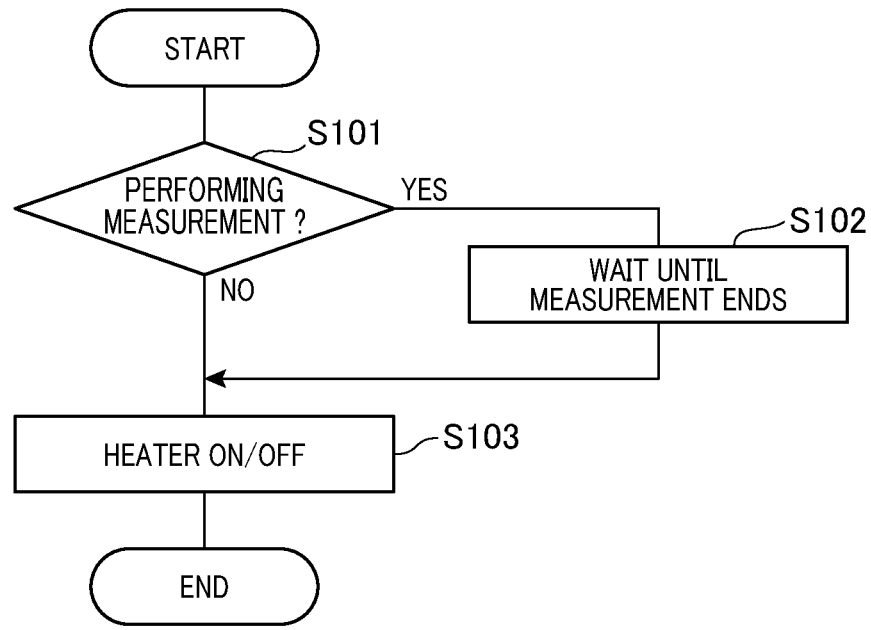
FIG. 5 is a flowchart of a control process that is to be performed by a controlling unit in the first embodiment.

Next, description will be given of a specific processing flow to be performed by the controlling unit 30 with reference to a flowchart in FIG. 5. The control process for the ON/OFF switching of energization shown in FIG. 5 is performed by the controlling unit 30 in a case where conditions for starting the energization of the accessory part 20 or conditions for stopping the energization of the accessory part 20 are satisfied on the basis of information from the in-vehicle sensor 200.

First, in S101, the controlling unit 30 determines whether the controlling unit 30 is performing one measurement for one measurement spot by using the measuring unit 10.

In a case where controlling unit 30 determines that the controlling unit 30 is not performing one measurement for one measurement spot by using the measuring unit 10 in S101, the process proceeds to S103 and the controlling unit 30 starts the energization of the accessory part 20 or stops the energization of the accessory part 20. The controlling unit 30 then ends the control process in FIG. 5.

Meanwhile, in a case where controlling unit 30 determines that the controlling unit 30 is performing one measurement for one measurement spot by using the measuring unit 10 in S101, the process proceeds to S102 and the controlling unit 30 waits for the measurement of the distance by using the measuring unit 10 to end. Afterwards, the process proceeds to S102 and the controlling unit 30 starts the energization of the accessory part 20 or stops the energization of the accessory part 20. The controlling unit 30 then ends the control process in FIG. 5.

1-3. Effects

According to the first embodiment described above in detail, the following effects are achieved.

(1a) The start and stop of the energization of the accessory part 20 is controlled in accordance with the state of the measurement of the distance by using the measuring unit 10. This makes it possible to reduce a decrease in the measurement accuracy of the distance measuring device resulting from starting and stopping the energization of the accessory part 20.

(1b) Specifically, the controlling unit 30 neither starts nor stops the energization of the accessory part 20 in a case where the controlling unit 30 is performing one measurement for one measurement spot by using the measuring unit 10. This makes it possible to keep noise from interfering with the waveform of the electrical signal inputted by the detector 12 resulting from starting and stopping the energization of the accessory part 20.

(1c) The controlling unit 30 neither starts nor stops the energization of the accessory part 20 during the detection period T1 for which the detector 12 detects the reflected wave. This is because a decrease in the measurement accuracy occurs due to noise interfering with the waveform of the electrical signal of the reflected wave. Such a configuration makes it possible to reduce a decrease in the measurement accuracy while shortening a period for controlling the ON/OFF switching of the energization of the accessory part 20.

(1d) A measurement accuracy required of a vehicular distance measuring device has become increasingly high with the development of autonomous driving technology. The configuration for a distance measuring device according to the first embodiment is effective especially for a vehicular distance measuring device.

2. Second Embodiment

2-1. Difference from First Embodiment

A second embodiment, the basic configuration of which is similar to that of the first embodiment, will be described mainly in terms of a difference thereof while the description of a common configuration is omitted.

Figure 6:
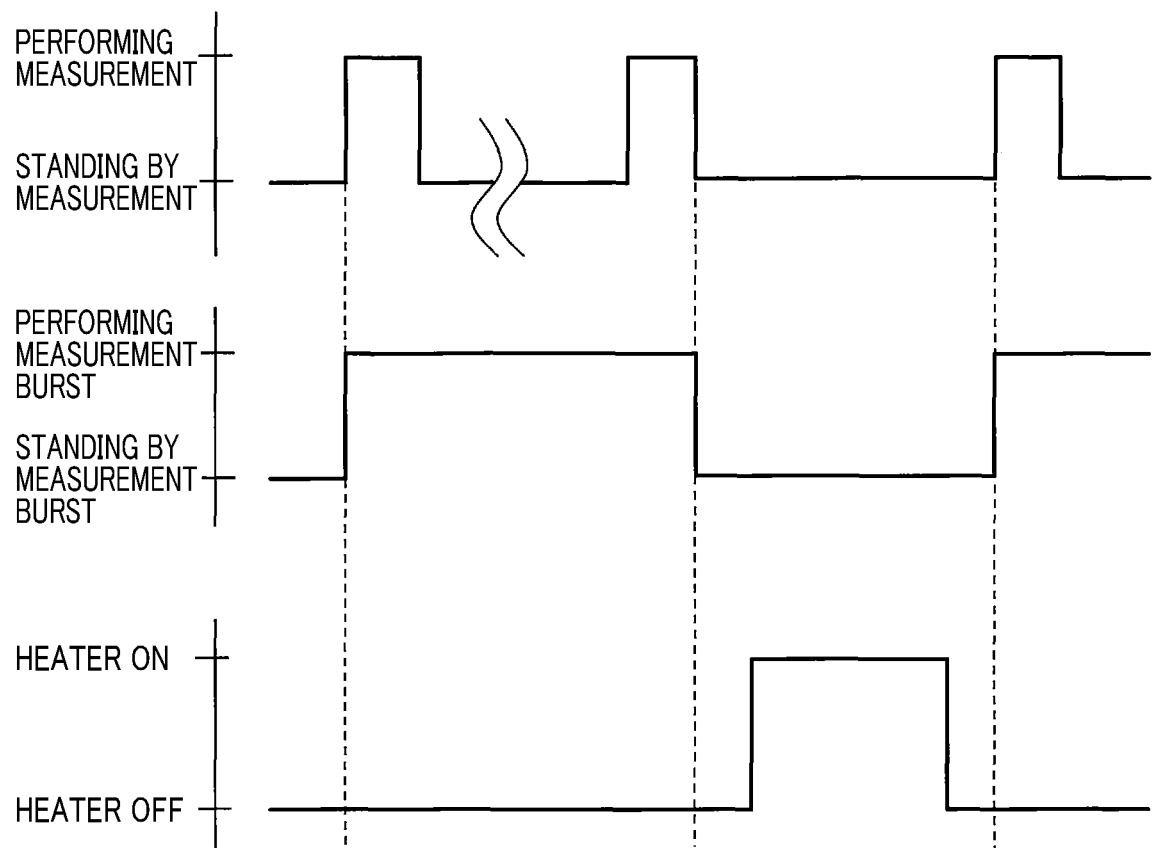
FIG. 6 is a diagram of assistance in explaining a relationship between the state of measurement of a distance by a measuring unit and the state of energization of a heater in a second embodiment.

In the above-described first embodiment, the controlling unit 30 neither starts nor stops the energization of the accessory part 20 during measurement for each measurement spot. In contrast, in the second embodiment, the controlling unit 30 neither starts nor stops the energization of the accessory part 20 during a series of measurements for a plurality of measurement spots present within the measurement range as shown in FIG. 6. It should be noted that a state where the controlling unit 30 performs a series of measurements by using the measuring unit 10 is referred to as a measurement burst.

2-2. Process

Figure 7:
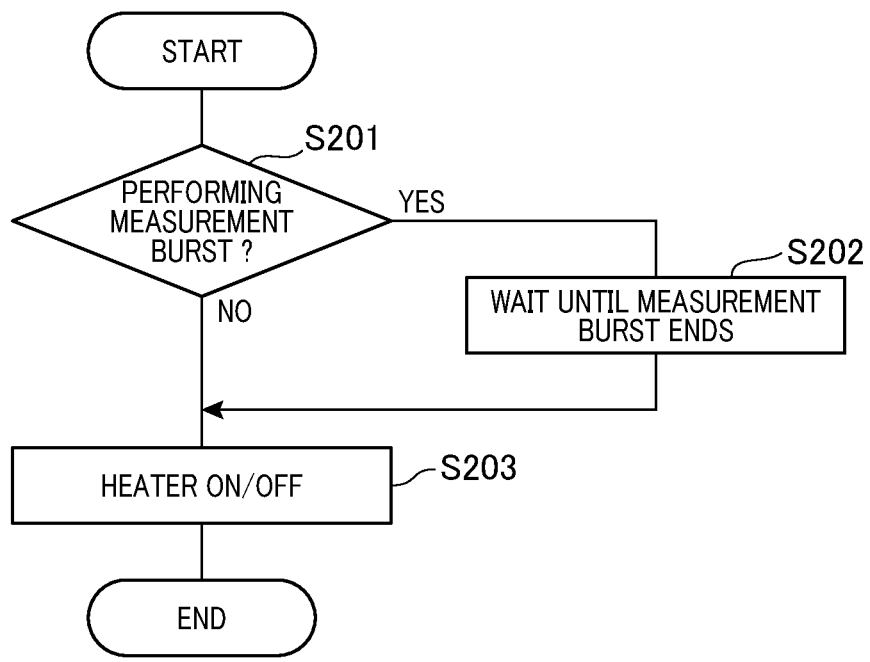
FIG. 7 is a flowchart of a control process that is to be performed by a controlling unit in the second embodiment.

Description will be given of a control process of the second embodiment, which is to be performed by the controlling unit 30 in place of the control process of the first embodiment, with reference to a flowchart in FIG. 7. The control process shown in FIG. 7 is performed by the controlling unit 30 in a case where conditions for starting the energization of the accessory part 20 or conditions for stopping the energization of the accessory part 20 are satisfied on the basis of information from the in-vehicle sensor 200.

First, in S201, the controlling unit 30 determines whether the measurement burst is being performed.

In a case where controlling unit 3 determines that the measurement burst is not being performed in S201, the process proceeds to S203 and the controlling unit 30 starts the energization of the accessory part 20 or stops the energization of the accessory part 20. The controlling unit 30 then ends the control process in FIG. 7.

Meanwhile, in a case where the controlling unit 30 determines that the measurement burst is being performed in S201, the process proceeds to S202 and the controlling unit 30 waits for the burst to end. Afterwards, the process proceeds to S203 and the controlling unit 30 starts the energization of the accessory part 20 or stops the energization of the accessory part 20. The controlling unit 30 then ends the control process in FIG. 7.

3. Third Embodiment

3-1. Difference from First Embodiment

A third embodiment, the basic configuration of which is similar to that of the first embodiment, will be described mainly in terms of a difference thereof while the description of a common configuration is omitted.

In the third embodiment, the controlling unit 30 neither starts the energization of the heater 80 nor stops the energization of the heater 80 in a first case of performing the measurement of the distance by using the measuring unit 10 and a second case that a period before the start of the next measurement is less than a predetermined threshold period.

3-2. Process

Figure 8:
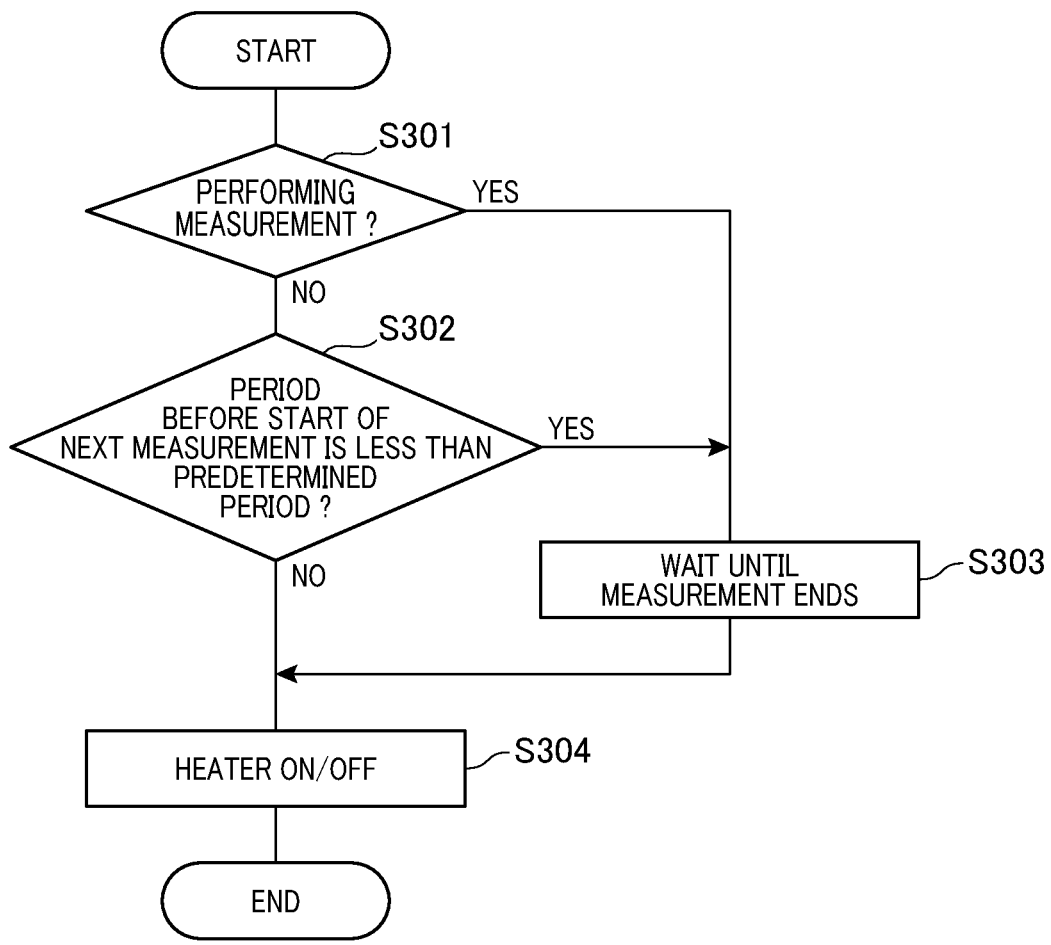
FIG. 8 is a flowchart of a control process that is to be performed by a controlling unit in a third embodiment.

Description will be given of a control process of the third embodiment, which is to be performed by the controlling unit 30 in place of the control process of the first embodiment, with reference to a flowchart in FIG. 8. The control process shown in FIG. 8 is performed by the controlling unit 30 in a case where conditions for starting the energization of the accessory part 20 or conditions for stopping the energization of the accessory part 20 are satisfied on the basis of information from the in-vehicle sensor 200.

First, in S301, the controlling unit 30 determines whether the measurement of the distance by using the measuring unit 10 is currently being performed.

In a case where the controlling unit 30 determines that the controlling unit 30 is performing one measurement for one measurement spot by using the measuring unit 10 in S301, the process proceeds to S302 and the controlling unit 30 determines whether the period before the start of the next measurement is less than the predetermined threshold period.

In a case where the period before the start of the next measurement is determined not to be less than the predetermined threshold period in S302, the process proceeds to S304 and the controlling unit 30 starts the energization of the accessory part 20 or stops the energization of the accessory part 20. The controlling unit 30 then ends the control process in FIG. 8.

Meanwhile, in a case where the controlling unit 30 determines that the controlling unit 30 is performing one measurement for one measurement spot by using the measuring unit 10 in S301, the process proceeds to S303 and, after the controlling unit 30 waits until the measurement ends, the process proceeds to S304. In S304, after starting the energization of the accessory part 20 or stopping the energization of the accessory part 20, the controlling unit 30 ends the control process in FIG. 8.

In a case where the period before the start of the next measurement is determined to be less than the predetermined threshold period in S302, the process proceeds to S303 and, after the controlling unit 30 waits until the measurement ends, the process proceeds to S304. In S304, after starting the energization of the accessory part 20 or stopping the energization of the accessory part 20, the controlling unit 30 ends the control process in FIG. 8.

3-3. Effects

According to the third embodiment described above in detail, the following effect is achieved in addition to the effects (1a), (1b), and (1d) of the above-described first embodiment.

(3a) When the switching ON/OFF of energization of the accessory part 20 is performed, noise continues for a while due to chattering or the like in some cases. According to the present embodiment, it is possible to reduce an influence of the noise on a measurement result even in such a case. That is, the above-described predetermined period is set such that the intensity of the continuously occurring noise reaches a threshold or less during a period from the ON/OFF switching of energization to the next measurement, whereby the noise is kept from interfering with the waveform of an electrical signal obtained during the next measurement.

4. Other Embodiments

The embodiments of the present disclosure are described hereinabove, but the present disclosure is, of course, by no means limited to the above-described embodiments and may be implemented in various embodiments.

(4a) In the above-described embodiments, the heater 80 is described as an example of the accessory part 20 but the accessory part 20 is not limited thereto. Specifically, examples of the accessory part 20 include a cleaning unit provided for the transmissive window 51 to clean the transmissive window 51.

Figure 9:
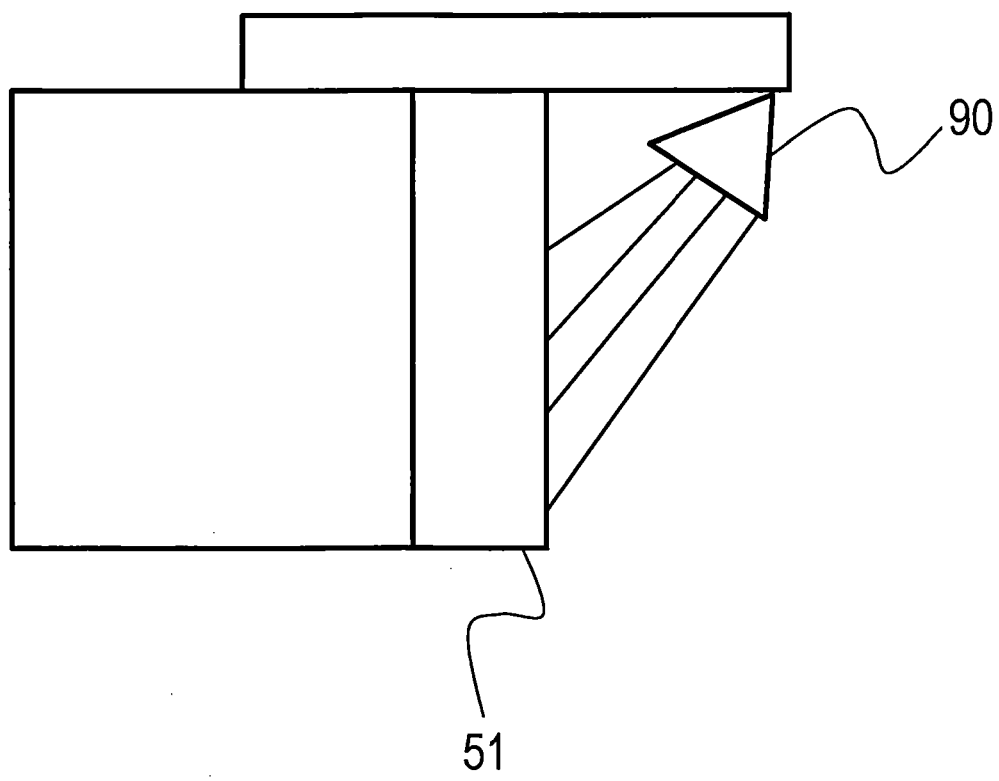
FIG. 9 schematically shows a cleaning unit.

FIG. 9 shows a washer 90 as an example of the cleaning unit. The washer 90 cleans the transmissive window 51 by spraying a cleaning agent onto the transmissive window 51. Other examples of the cleaning unit include a wiper and an ultrasonic vibrator.

It should be noted that in a case where the accessory part 20 is a motor-driven part such as the washer and the wiper, chattering is likely to occur. Accordingly, the process of the above-described third embodiment is effective especially for a case where the accessory part 20 is a motor-driven part.

(4b) In the above-described embodiments, the lidar device is described as an example of a distance measuring device, but the type of the distance measuring device is not limited thereto. Specifically, examples of the distance measuring device include a millimeter wave radar and an ultrasonic sensor.

(4c) In the above-described embodiments, the controlling unit 30 determines whether the controlling unit 30 is performing one measurement for one measurement spot or controlling unit 30 is in the standby state, depending on whether the present time is within the detection period T1. However, a method of determining whether the controlling unit 30 is performing one measurement for one measurement spot or controlling unit 30 is in the standby state, is not limited thereto. Specifically, the controlling unit 30 may determine whether the controlling unit 30 is performing one measurement for one measurement spot or controlling unit 30 is in the standby state depending on whether the present time is within a measurement period set by the controlling unit 30 itself. Examples of the measurement period include a period T2 shown in the graph (a) in FIG. 4. The period T2 refers to a period from the start of the application of light by the applying unit 11 to the elapse of the detection period T1. It should be noted that in a case where the period T2 starts at the same time as the start of the application of light, the period T2 is equal to the detection period T1.

(4d) In the above-described first embodiment, the controlling unit 30 restricts the start and stop of the energization of the accessory part 20 during the detection period T1 by the detector 12. A period for the controlling unit 30 to restrict the start and stop of the energization of the accessory part 20 is not limited to the detection period T1 but only has to include at least the detection period T1.

(4e) In the above-described embodiments, the lidar device 100 as a distance measuring device is installed in a front portion of the vehicle, but an installation position for the distance measuring device in the vehicle is not limited thereto. Specifically, the distance measuring device may be installed, for example, in the neighborhood of a side portion or a rear portion of the vehicle.

(4f) In the above-described embodiments, the transmissive window 51 is a window that allows both a transmission wave and a reflected wave to pass through, but the transmissive window 51 may be configured to allow at least either one of a transmission wave or a reflected wave to pass through. Further, in the above-described embodiments, the transmissive window 51 is transparent so that light as a transmission wave can pass through, but it is not necessary for the transmissive window 51 to be transparent as long as it allows a transmission wave to pass through. That is, various materials are selectable for the transmissive window 51 depending on the type of a transmission wave.

(4g) Functions of one component in the above-described embodiments may be distributed as a plurality of component or functions of the plurality of components may be integrated in one component. Further, a part of the configuration of any of the above-described embodiments may be omitted. Further, at least a part of the configuration of any of the above-described embodiments may be, for example, added or replaced in the configuration of any other above-described embodiment.

What is claimed is:

1. A distance measuring device comprising:
a measuring unit that includes an applying unit configured to apply a transmission wave and a detector configured to detect a reflected wave resulting from the transmission wave;
a controlling unit configured to perform a measurement, by using the measuring unit, a distance to an object to which the transmission wave is applied; and
an accessory part that is attached to the measuring unit and configured to operate when energized, wherein
the controlling unit is configured to:
control on/off switching of energization of the accessory part based on information acquired from a sensor mounted on a mobile body on which the distance measuring device is mounted; and
restrict on/off switching of energization of the accessory part in accordance with a state of the measurement of the distance performed by using the measuring unit.

2. The distance measuring device according to claim 1, wherein
the distance measuring device is a lidar device that applies light as the transmission wave.

3. The distance measuring device according to claim 1, wherein
the distance measuring device further comprises a transmissive window that allows at least one of the transmission wave or the reflected wave to pass through, and
the accessory part includes a heater provided on the transmissive window.

4. The distance measuring device according to claim 1, wherein
the distance measuring device further comprises a transmissive window that allows at least one of the transmission wave or the reflected wave to pass through, and
the accessory part includes a cleaning unit provided for the transmissive window to clean the transmissive window.

5. The distance measuring device according to claim 1, wherein
the controlling unit is configured to:
repeatedly perform a series of measurements for a plurality of measurement spots within a measurement region by using the measuring unit;
determine whether the controlling unit is performing measurement of the distance by using the measuring unit or the controlling unit is in a measurement standby state which is a temporary measurement standby state after measurement for one measurement spot; and
not perform on/off switching of the energization of the accessory part while performing the measurement of the distance by using the measuring unit.

6. The distance measuring device according to claim 5, wherein
the applying unit is configured to perform intermittent application of the transmission wave;
the controlling unit is configured to have a measurement mode that performs the measurement of the distance and a standby mode that stands by the measurement of the distance; and
repeats a sequence of the measurement mode and the standby mode in accordance with the intermittent application of the transmission wave,
the controlling unit being configured to not perform on/off switching of the energization of the accessory part in:
a first case of performing the measurement of the distance by using the measuring unit; and
a second case that a period of the standby mode included in one of the repeated sequences is less than a predetermined threshold period.

7. The distance measuring device according to claim 5, wherein
the controlling unit is configured to not perform on/off switching of the energization of the accessory part at least during a detection period for which the detector detects the reflected wave.

8. The distance measuring device according to claim 1, wherein
the controlling unit is configured to:
repeatedly perform, as the measurement, a series of measurements for a plurality of measurement spots within a measurement region by using the measuring unit; and
not perform on/off switching of the energization of the accessory part while performing the series of the measurements.

9. The distance measuring device according to claim 1, wherein
the sensor is at least one of an outdoor air temperature sensor, an indoor air temperature sensor, and a vehicle speed sensor, and
the information acquired from the sensor is information other than the distance to the object.

* * * * *